United States Patent [19]

Lee et al.

[11] Patent Number: 5,281,812
[45] Date of Patent: Jan. 25, 1994

[54] LIGHT BEAM SCANNING SYSTEM INCLUDING PIEZOELECTRIC MEANS FOR CORRECTION OF CROSS SCAN ERROR

[75] Inventors: J. Kelly Lee, Rochester; Robert H. Cuffney, Honeoye Falls; Richard A. Littlefield; William R. Markis, both of Rochester, all of N.Y.

[73] Assignee: Eastman Kodak Company, Rochester, N.Y.

[21] Appl. No.: 923,404

[22] Filed: Jul. 31, 1992

[51] Int. Cl.⁵ .............................................. H01J 3/14
[52] U.S. Cl. .................................. 250/235; 358/497
[58] Field of Search .................... 250/234, 235, 236; 358/494, 497, 481; 359/216, 217

[56] References Cited

U.S. PATENT DOCUMENTS

| | | | |
|---|---|---|---|
| 3,504,182 | 3/1970 | Pizzurro et al. | 250/199 |
| 3,902,783 | 9/1975 | Bodlaj | 350/6 |
| 3,981,566 | 9/1976 | Frank et al. | 350/285 |
| 4,264,809 | 4/1981 | Fernside | 250/201 |
| 4,310,757 | 1/1982 | Check et al. | 250/236 |
| 4,325,637 | 4/1982 | Moore | 356/359 |
| 4,436,364 | 3/1984 | Lauer et al. | 350/6.6 |
| 4,708,420 | 11/1987 | Liddiard | 350/6.6 |
| 4,711,573 | 12/1987 | Wijntjes et al. | 356/346 |
| 4,728,789 | 3/1988 | Broockman et al. | 250/236 |
| 4,750,045 | 6/1988 | Ohara et al. | 358/285 |
| 4,778,233 | 10/1988 | Christenson et al. | 350/6.6 |
| 4,829,175 | 5/1989 | Goto et al. | 250/236 |
| 4,960,312 | 10/1990 | Razzaghi | 350/3.71 |
| 4,971,413 | 11/1990 | Inoue | 250/236 |
| 5,006,705 | 4/1991 | Saito et al. | 250/235 |
| 5,018,808 | 5/1991 | Meyers et al. | 250/235 |

OTHER PUBLICATIONS

J. Kelly Lee, Reprint-Applied Optics, vol. 18, p. 454, Feb. 15, 1979, Piezoelectric bimorph optical beam scanners: analysis and construction.
Hamamatsu Technical Data, Large-Area PSD Series (Long-Area 1D PSD and 2D PSD), pp. 1–8, Aug. 1989 (rev.).

Primary Examiner—David C. Nelms
Attorney, Agent, or Firm—Thomas H. Close

[57] ABSTRACT

Beam scanning system includes a rotatable element for receiving a stationary light beam at successive element facets to thereby impart a scanning motion to the light beam so as to scan a beam receiving medium. Deviation in the mechanical or optical performance related to each successive facet are corrected by use of a high-speed beam deflector operated in either a closed loop or open loop servo system. The beam deflector includes a unique piezoelectric plate and reflecting body structure, wherein parallel plates of piezoelectric material are bonded at selected locations to a reflecting body with flexible adhesive. The plates are supported by a platform and operatively connected to a plate driving means to effect motion of the body in a push-pull arrangement with respect to the platform. The resulting structure has a high resonant frequency even though a reflecting body in the form of relatively large glass mirror may be employed.

1 Claim, 6 Drawing Sheets

FIG. 3A fn=fmax

FIG. 3B fn≪fmax

FIG. 3C fn<fmax

LIGHT BEAM SCANNING SYSTEM INCLUDING PIEZOELECTRIC MEANS FOR CORRECTION OF CROSS SCAN ERROR

CROSS REFERENCE TO RELATED APPLICATION

This application is related to commonly-assigned, copending U.S. patent application Ser. No. 923,905, filed concurrently herewith in the name of J. K. Lee and entitled, "HIGH-SPEED LIGHT BEAM DEFLECTOR", the disclosure of which is included herein by reference.

FIELD OF THE INVENTION

This invention relates in general to beam scanning systems and in particular to rotating polygon or hologon beam scanning systems incorporating means for correcting cross scan errors arising from facet to facet disparities in the polygon or hologon.

BACKGROUND OF THE INVENTION

Some light beam scanning apparatus utilize a beam scanner having a rotable element such as a polygonal mirror or holographic beam scanning disc (hologon) to impart a scanning motion to a stationary light beam. A beam source directs the imagewise-modulated stationary beam onto successive facets of the rotating polygon or hologon. As the stationary beam encounters each new facet, the beam is thereby made to scan a beam receiving medium. Relative cross-scan motion between the write beam and the beam receiving medium allows the recording of plural rasterized image lines so as to form an image frame. However, because the beam scanner has optical or mechanical characteristics that differ from facet to facet, there is an angular variation of the scan beam from line to line. The separation of adjacent line exposures on the beam receiving medium is modulated in an undesirable pattern that is known as banding.

One way to reduce banding is to use a single facet scanner, but this severely reduces the active time that the beam can be used to write. Hence, the most common approach to reduce banding is to locate anamorphic optics in the beam path. Cylindrical and toroidal lenses are often used (cf. L. Beiser, "Laser Scanning Systems", in Laser Applications, Vol 2, Academic Press, pp. 53-159, 1974). However, anamorphic optical systems are complex and costly. An acousto-optic (AO) or electro-optical (EO) deflector may also be located in the beam path to correct the angular errors of the scanning element. Such deflectors, however, are costly and necessitate additional beam-shaping optics. There is accordingly a need for a beam scanning system that incorporates means for effecting angular correction of the write beam on a facet-to-facet basis without incurring the cost and complexity of prior art approaches, especially in the reproduction of continuous tone image data.

SUMMARY OF THE INVENTION

A beam scanning system may be constructed according to the present invention to include a rotatable element beam scanning means that receives a stationary light beam at successive facets, and thereby imparts a scanning motion to a light beam for scan exposure of a beam receiving medium. Deviations in the mechanical or optical performance of the beam scanner are corrected by use of a high-speed beam deflector operated in a closed loop or open loop servo system. The beam deflector includes unique structure including dual piezoelectric plates and a reflecting body, wherein parallel plates of piezoelectric material are bonded at selected locations to a reflecting body with flexible adhesive. The plates are supported by a platform and are operatively connected to a plate driving means to effect motion of the body in a push-pull arrangement with respect to the platform. The resulting structure has a high resonant frequency even though a reflecting body in the form of relatively large glass mirror may be employed.

The invention, its objects, and advantages, will become more apparent in the detailed description of the preferred embodiments presented below.

DETAILED DESCRIPTION OF THE INVENTION

A preferred embodiment of the present invention will now be described with reference to the accompanying drawings, wherein like reference numerals refer to like components.

Figure 1:
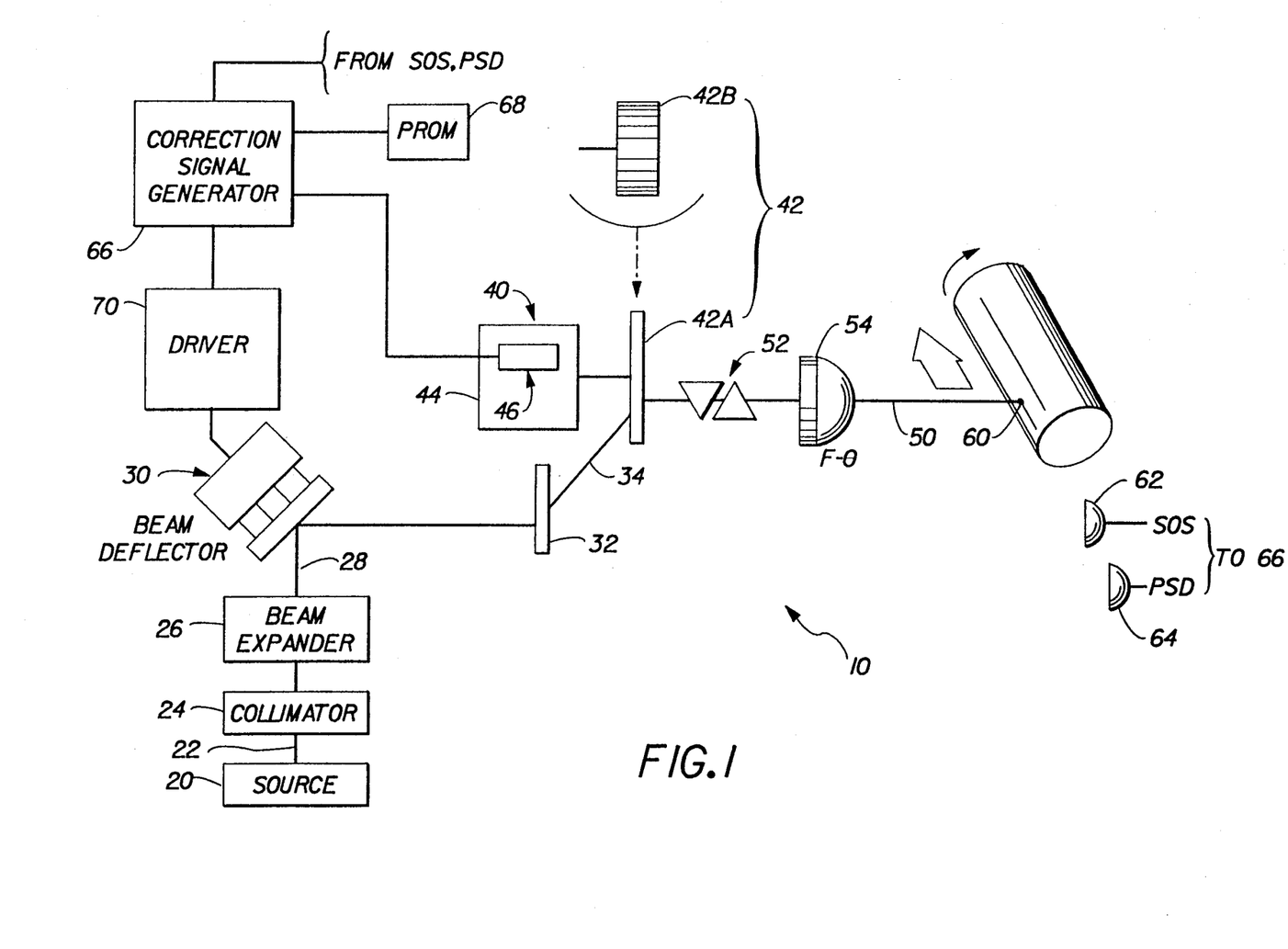
FIG. 1 is a simplified schematic view of a light beam scanning system that includes means for correcting cross scan error constructed according to the present invention.

FIG. 1 illustrates a preferred embodiment of the present invention, whereby one or more image frames of image data may be exposed on an image receiving medium without incurring the undesirable effects of cross scan error.

A beam scanning system 10 includes a modulated light beam source 20 preferably in the form of a laser beam source such as a laser diode. A stationary light beam 22 is imagewise modulated by means known in the art (not shown) according to image data and emitted by the beam source. The stationary beam 22 is directed through a beam collimator 24 and then a beam expander 26. The expanded beam 28 is directed to a novel high-speed beam deflector 30, the construction of which will be discussed in detail with respect to FIGS. 2 and 3, and then to a stationary grating 32.

The light beam 34 is directed to a beam scanner 40, preferably including a rotatable element 42 in the form of a rotatable hologon 42A, and motor drive 44. (An alternative embodiment of the rotatable element 42 would omit the grating 32 and include a rotatable polygonal mirror 42B suited for rotation by the drive means.) The drive means 44 includes an encoder 46 or similar means for detecting the position of the operative facet of the hologon 42A or, alternatively, the polygon 42B. The light beam 34 is converted to a scanning beam 50 and directed to an output prisms pair 52 and an F-theta lens 54. The scanning beam 50 is thereafter incident on a beam receiving medium 56 such that plural scan lines 58 are traced by the moving beam spot 60. Known means (not shown) for accomplishing relative cross scan movement of the scanning beam 50 and the medium 56 causes successive scan lines to form an image frame on the medium 56.

As the scanning beam 60 approaches the onset of a scan line 58, it encounters a start of scan detector 62 and (optionally) a cross-scan beam position detector 64, the latter being preferably in the form of a lateral effect photodiode. With the exception of the high-speed beam deflector 30 and the cross-scan beam position sensing detector 64, the forgoing components are operable according to requirements known in the art and thus will not be discussed in detail.

Also illustrated in FIG. 1, and pertinent to the present invention, are a correction signal generator 66, a correction signal data memory means 68 (the latter preferably in the form of a programmable read only memory, or PROM), and a beam deflector driver 70. In operation, the correction signal generator 66 receives position information from the encoder 46 that indicates (in advance) the approach of the operative facet of the hologon 42A or polygon 42B into the light beam 34. The correction signal generator also receives scanning beam position information SOS and PSD from the start of scan detector 62 and position sensing detector 64.

During the time the scanning beamspot 60 is located between two successive line exposures of the beam receiving medium, the correction signal generator 66 outputs a correction signal to the driver 70. The correction signal, after amplification by the driver 70, is used to drive the beam deflector 30 such that the high speed beam deflector is continually operated to establish a selected angle of incidence of the light beam 34 on the hologon 42A or polygon 42B.

The magnitude and direction of the correction signal is derived from predetermined data resident in the memory 68. The data is selected and read by the correction signal generator 66 according to which of the several facets is known to be affecting the light beam 34.

The foregoing components are thus operable as a high speed servo system to obtain precise control of the position of the beam deflector 30, and (as a direct and controlled result) the angular incidence of the light beam 34 on the rotatable element 42. The ultimate result is that the position of each scan line is accurately controlled to compensate for cross scan errors which otherwise would result from repetitive disparities in the mechanical or optical properties associated with each polygon or hologon facet.

The present invention contemplates that the foregoing description of the servo system provides the gist of the invention and may be modified according to useful techniques known in the art. For example, a feedback signal indicative of the position of the beam deflector may be obtained and this beam deflector feedback signal would be compared with the data derived from memory such that the correction signal effects the desired position; any difference between the measured position and the desired position is continually diminished.

A first important aspect in the operation of the servo system in accordance with the present invention, however, is the responsiveness (bandwidth) of the beam deflector. An insufficient fundamental resonant frequency in a mechanical scanner is tantamount to reducing the bandwidth of the scanner since little angular movement can be obtained in a mechanical scanner beyond its fundamental resonant frequency. Accordingly, and in a particular feature of the present invention, the contemplated beam deflector 30 can be driven at a higher frequency than heretofore experienced in prior art beam deflectors. A beam deflector constructed according to the embodiment illustrated in FIG. 2 is also capable of driving mirrors of larger than usual dimensions at a higher than usual frequency. A second necessary aspect is the acquisition and storage of the data that must be resident in the memory for implementing facet-to-facet corrections. These aspects will now be discussed with respective reference to FIGS. 2–3 and 4.

Figure 2A:
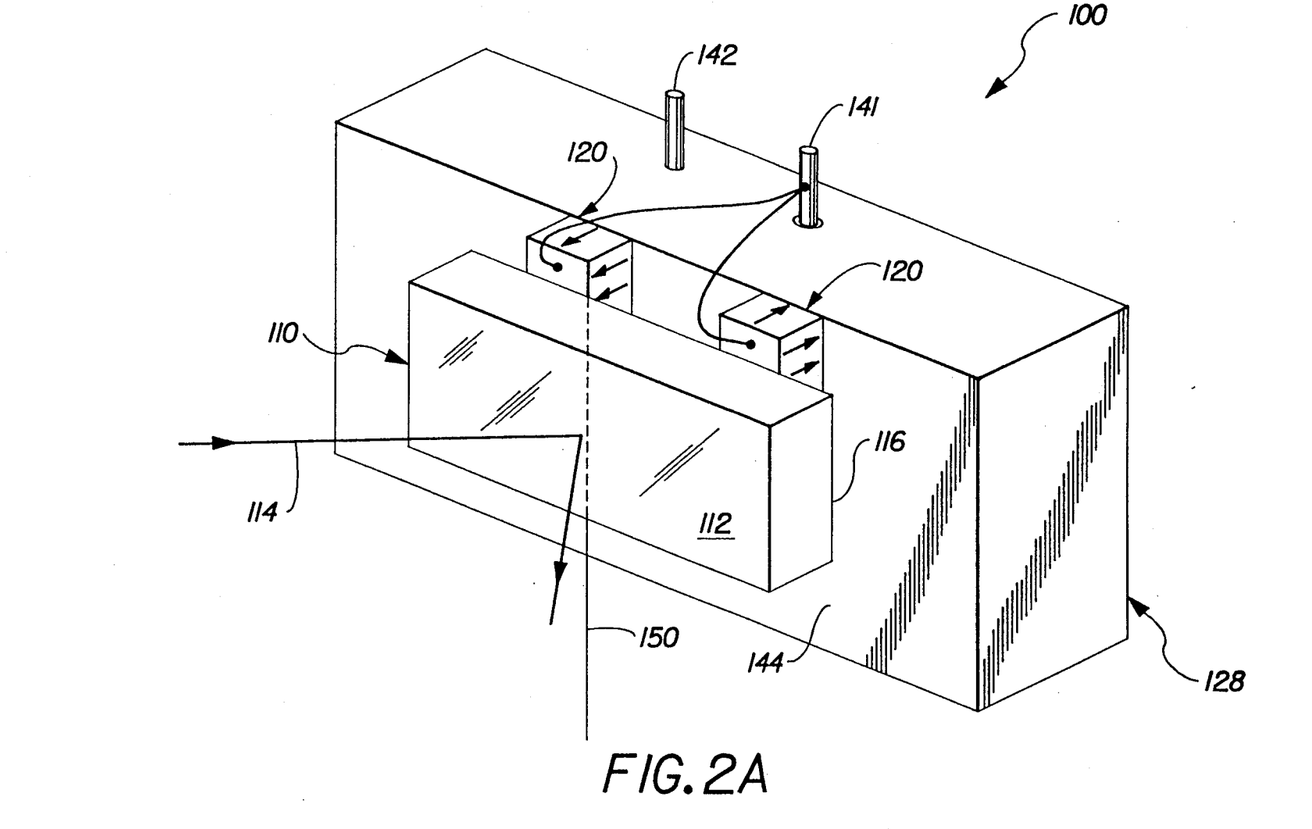
FIGS. 2A AND 2B are side perspective views of a novel high speed beam deflector employed in the beam scanning system of FIG. 1.
Figure 2B:
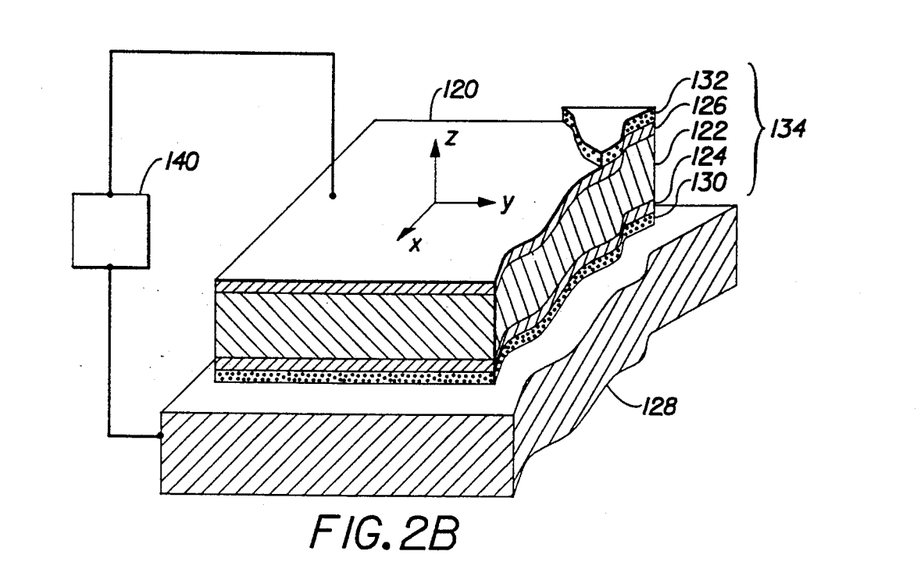

FIGS. 2A and 2B show a preferred embodiment of a beam deflector 100 (previously illustrated as deflector 30 in FIG. 1) constructed according to the present invention. A beam reflecting body 110, preferably provided in the form of a planar glass mirror (of dimensions, for example, of 25 mm width, 12.5 mm height, and 6 mm thickness) includes a reflective coating 112 on its front surface. The contemplated mirror thickness is preferably selected in order to maintain a $1/10^{th}$ wave surface quality with respect to the incident light beam 114. The back of the reflecting body 116 is rough polished for better bonding to first and second very thin piezoelectric plates 120 (each of dimensions, for example, of 4 mm width, 15 mm length, and 1 mm thickness) constructed of piezoelectric material 122 sandwiched between first and second electrodes 124,126 pairs. The piezoelectric material 122 is selected as one having a relatively high piezoelectric constant operable in the $d_{33}$ mode which is characterized as having a piezoelectric polarization axis that is coaxially aligned with the predominant axis of the piezoelectric motion (expansion or contraction) of the piezoelectric material. Such piezoelectric material is commercially available in the form of lead zirconate titanate, from Morgan Matroc, Inc. as item PZT-5H.

Each plate 120 is mounted to a supporting platform 128 at a first plate electrode 124 via a first bonding layer 130 formed of conductive adhesive such as conductive silver-filled epoxy. The reflecting body 110 is bonded to the second (opposing) electrode 126 of each plate 120 via a second bonding layer 132 of flexible adhesive, such as a silicone rubber compound. The thickness of the second bonding layer 132 is preferably established at approximately 25 to 75 micrometers. As will be appreciated further in the description below, this construction allows the second bonding layer 132 to flex a small amount when the reflecting body is rotated. Nonetheless, the overall structure 134 formed of the combination of a piezoelectric plate 120 and first and second bonding layers 130,132 is relatively stiff because of its minimal thickness, and the expansion or contraction of each piezoelectric plate 120 with respect to the platform 128 is well-coupled to the reflecting body. The second bonding layer 132 also provides a small damping effect, for better control of the resultant rotation of the reflecting body about the rotation axis. The first and second plates 120 are mounted with respect to the platform 128 in opposing piezoelectric polarity, that is, the first plate would be poled up if the second plate is poled down, or vice-versa.

As further shown in FIG. 2B, each piezoelectric plate 120 is electrically driven in parallel with the other. Connections from the plates 120 to a plate driving means 140 are made at the protruding ends of the plates via a first binding post 141 and at the platform via a second binding post 142 The platform 128 includes an integral conductive surface 144 that interfaces with the first plate electrode 124. The platform 128 is preferably formed of a solid conductive material, such as aluminum. The plate driving means 140 includes a suitable high voltage field source and other control circuit components that are selectable as known in the art and thus are not discussed here.

It is contemplated that both the piezoelectric plates 120 are constructed and operated to effect a selected piezoelectric mode wherein an electric field applied along vector z results in an expansion or contraction of the plate along the same vector direction. Accordingly, with application of an electric field between the first and second plate electrodes 124,126 (i.e., along the z direction) of each plate 120, the thickness of a first plate will expand while the same dimension of a second plate contracts, or vice versa depending upon the polarity of the applied field. The reflecting body 112 will then tilt about a rotation axis 150, depending on the direction and magnitude of the applied voltage.

Figure 3A:
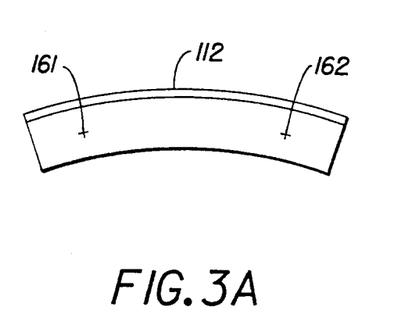
FIGS. 3A-3D are a schematic, cross-sectional illustration of a portion of one of the piezoelectric plates and the supporting platform in the beam deflector of FIG. 2.
Figure 3B:
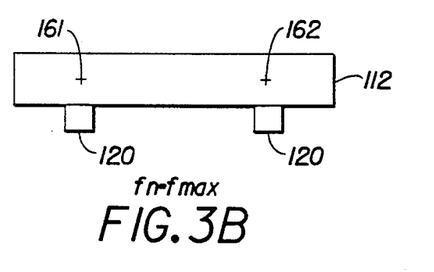
Figure 3C:
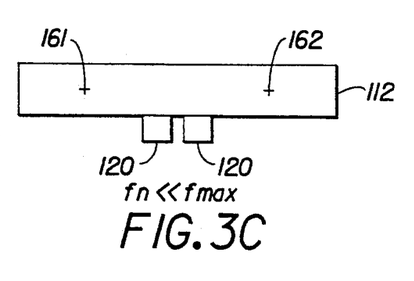
Figure 3D:
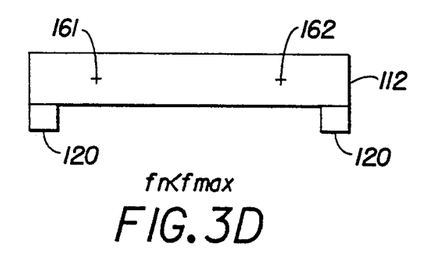

As shown in FIG. 3A, and according to a particular feature of the invention, the reflecting body 112 may be considered to move as a free-free beam subject to deflection such that it exhibits first and second nodal points 161,162 in a first mode of vibratory movement. As shown in FIG. 3B, and according to another particular feature of the invention, the first and second piezoelectric plates 120 are located respectively at these first and second nodal 161,162 points such that the resonant frequency of the system $f_n$ is maximized to its optimal extent $f_{max}$. In contrast to the desired configuration shown in FIG. 3B, and as shown in FIGS. 3C and 3D, the resonant frequency $f_n$ is lessened considerably when the piezoelectric plates are located at points other than the first mode nodal points 161,162.

Figure 4:
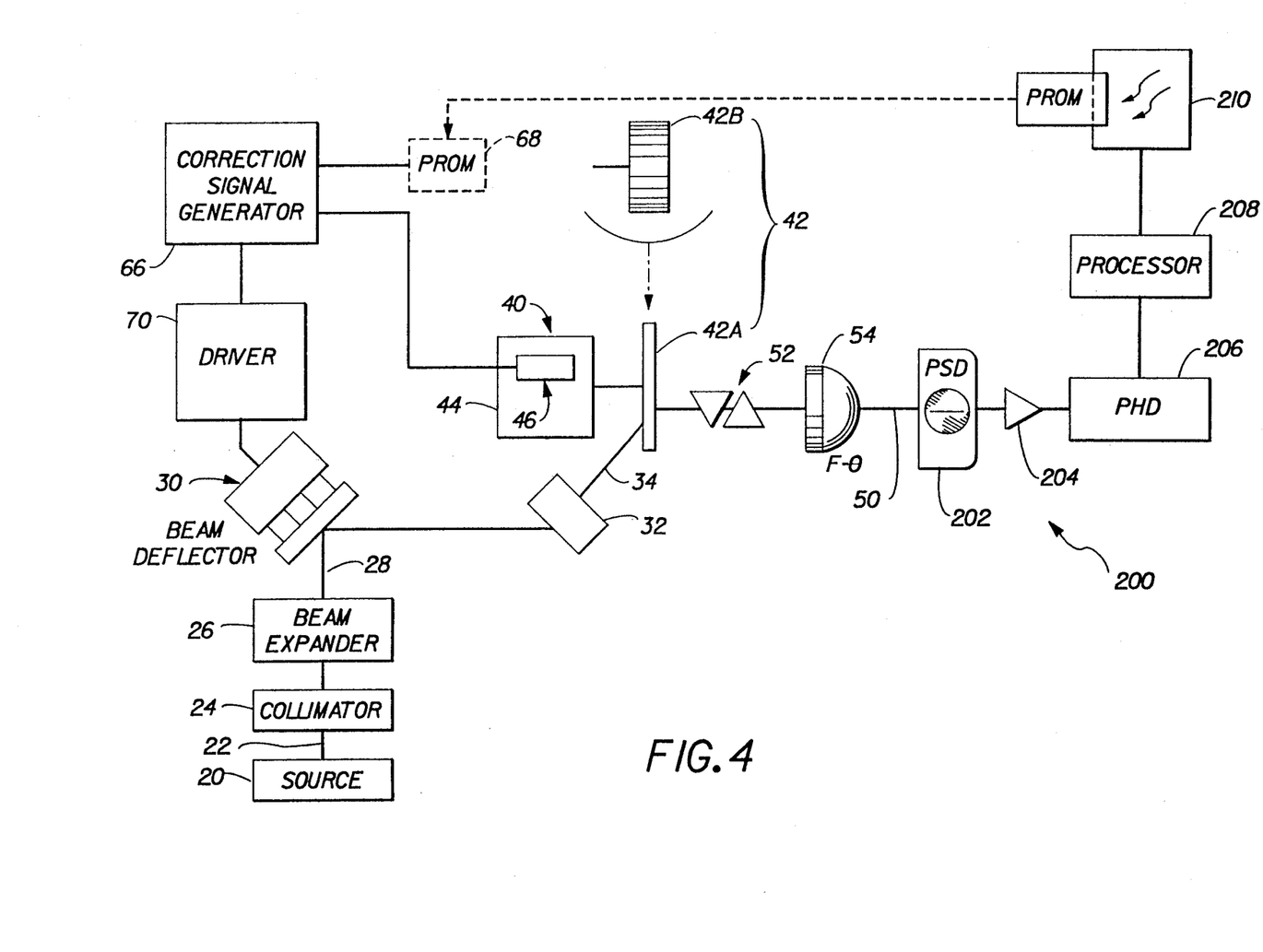
FIG. 4 is a simplified schematic view of the beam scanning system of FIG. 1 with additional components useable for acquisition and storage of cross scan error correction data.

The reflecting body can therefore be driven at a higher frequency than heretofore experienced in prior art beam deflectors. A beam deflector 100 constructed according to the arrangement of FIG. 4 is also capable of driving a reflecting body of larger than usual dimensions at a higher than usual frequency. Experimental versions of the contemplated beam deflector have been found to provide a first resonant frequency $f_n$ of over 40 kHz. Further, such extended resonant frequency is high enough for the beam deflector 100 to be used in either a closed loop or an open loop servo system. The contemplated beam deflector 100 is also easy to assemble at a low cost, and due in part to the flexibility of the second bonding layer 130, achieves a low resonant system quality factor Q. The contemplated beam deflector 100 is therefore more easily controlled and offers greater beam positioning accuracy than prior art devices. Further details on the construction and operation of the beam deflector 100 may be found in commonly-assigned, copending U.S. patent application Ser. No. 923,405, filed concurrently herewith in the name of J. K. Lee and entitled, "HIGH-SPEED LIGHT BEAM DEFLECTOR".

FIG. 4 illustrates further apparatus for the acquisition and storage of the requisite data in memory for use in effecting cross scan error reduction in the beam scanning system. A beam position sensing subassembly 200 is installed in place of the beam receiving medium 56. The element 42 in the beam scanner is then stepwise rotated such that each facet of the rotatable element 42 is positioned in the light beam 32. While the element 42 is present, the angular error of each facet is measured by a beam spot position sensitive detector (PSD) 202. Preferably the PSD detector 202 includes a lateral effect photodiode such as the Hamamatsu S1670, commercially available from Hamamatsu Photonics K.K., Japan. The PSD output is filtered by network 204 and applied to a peak hold and dump (PHD) circuit 206, the output of which is then provided to a processor 208. The correction signal that must be applied to the driver to correct the beam cross scan error at each facet is then computed by the processor and translated to data suited for storage in the memory 68. In the preferred embodiment, the data is burned into the PROM by a memory data programmer 210. Removal of the PROM from the programmer 210, and subsequent installation of the PROM in the correction signal generator 66, completes the data acquisition and storage sequence.

In an alternative mode of operation, with reference again to FIG. 1, a PSD 202 in the form of a split cell detector or lateral effect photodiode may instead be permanently installed at the beginning of the scan line. The angular error of each facet is measured prior to writing a scan line 58. This approach requires that the beam deflector 30 operate at a sufficiently high frequency so as to reach a stable equilibrium position before the start of the active line.

Figure 5:
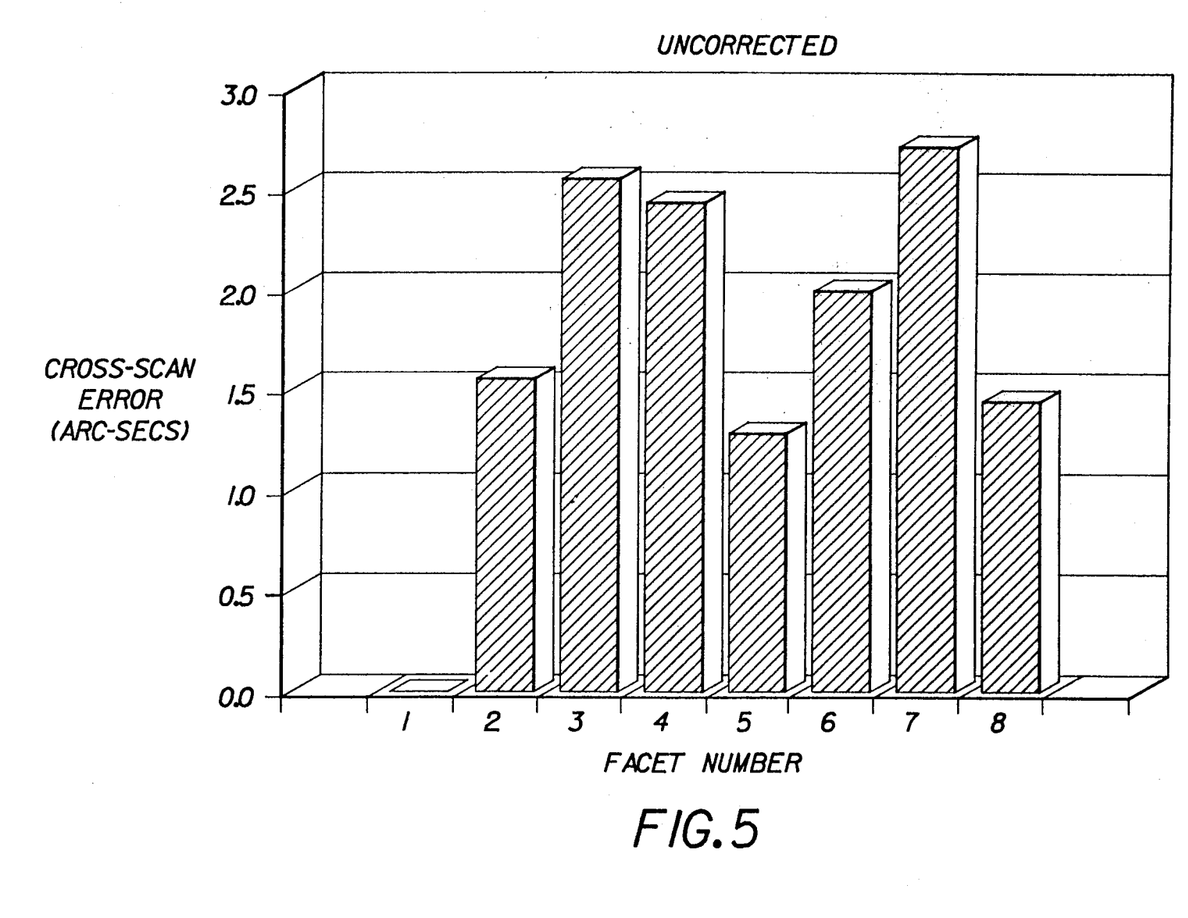
FIGS. 5 and 6 are graphical representations of the uncorrected and corrected cross-scan error measured in the beam scanning system of FIG. 4.
Figure 6:
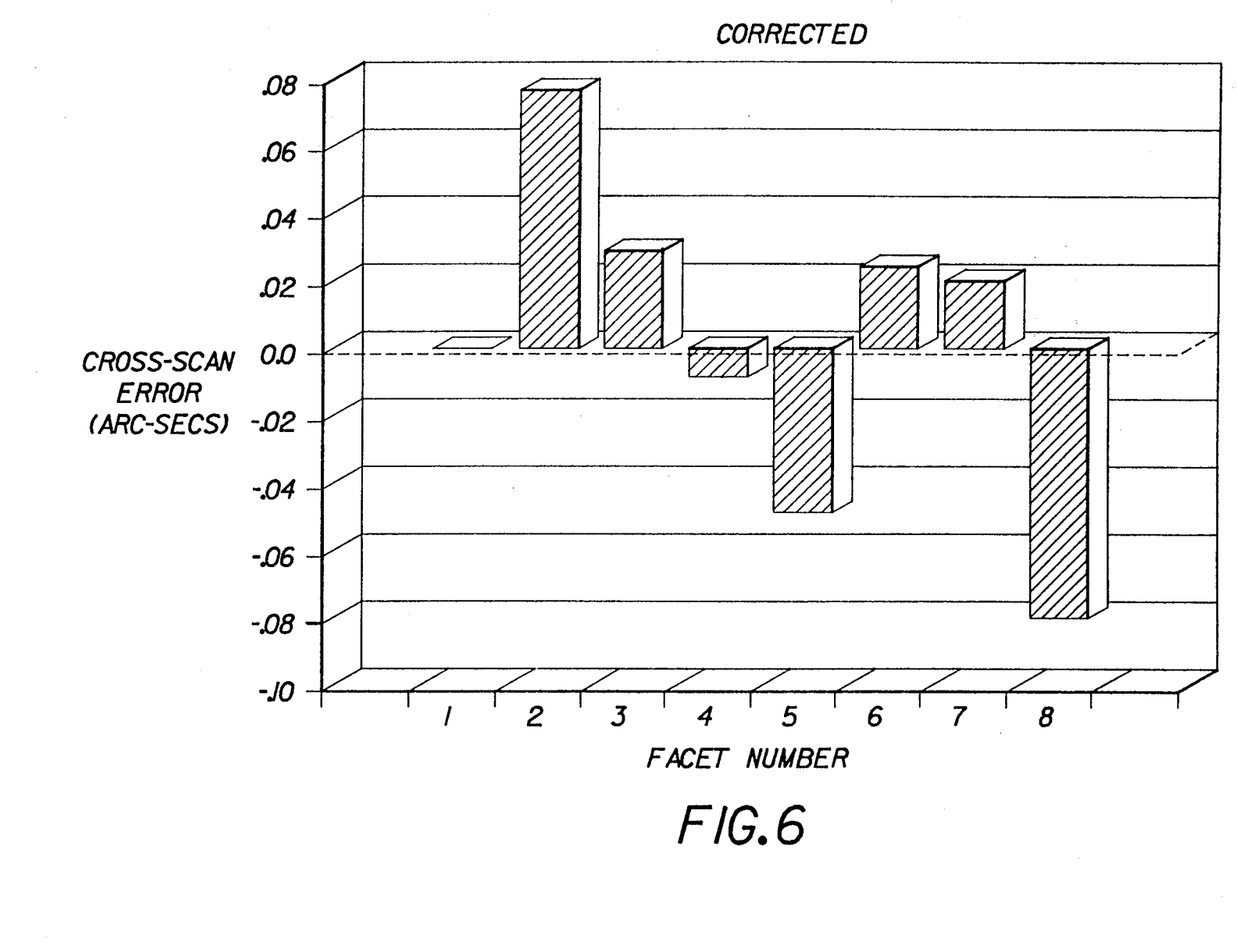

Experimental versions of the contemplated beam deflector 30 have been found to provide a first resonant frequency of over 40 kHz. Such extended resonant frequency is therefore high enough for the beam deflector 30 to be used in either closed loop or open loop servo system modes. The contemplated beam deflector 30 is also easy to assemble at a low cost, and due in part to the flexibility of the second bonding layer, achieves a low resonant system quality factor Q. As shown in FIGS. 5 and 6, contemplated beam scanning system therefore offers greatly reduced cross scan error and a corresponding improvement in beam positioning accuracy than found in prior art devices.

The invention has been described in detail with particular reference to a preferred embodiment thereof, but it will be understood that variations and modifications can be effected within the spirit and scope of the invention.

What is claimed is:

1. A beam scanning system for providing a scanning light beam, comprising:
  a light beam source for providing a light beam;
  a rotatable element beam scanner, said rotatable element having a plurality of facets thereon, said plurality including an operative facet positionable in the light beam;
  means for deflecting the light beam to the operative facet at a predetermined incident angle, said deflecting means including:
  a platform
  first and second piezoelectric means each means including a piezoelectric element operable in a $d_{33}$ mode, and means operatively connected to the piezoelectric to operate the piezoelectric element in the $d_{33}$ mode;
  a reflecting body including a first reflective surface suitable for reflecting the light beam, and a second back surface;
  first means for operatively connecting the piezoelectric means to the platform; and second means for operatively connecting the reflecting body to the first and second piezoelectric means wherein piezoelectric expansion or contraction of each of said piezoelectric means is coupled to the reflecting body at a location substantially adjacent to a selected one of the first and second nodal points of the reflecting body;

means for storing predetermined correction data derived from measured cross scan error contributed by the operative facet; and means for controlling the deflecting means according to said predetermined correction data to achieve the predetermined incident angle and thereby correct the cross scan error.

* * * * *